(12) United States Patent
Lo

(10) Patent No.: US 7,082,420 B2
(45) Date of Patent: Jul. 25, 2006

(54) CONVEXIFICATION METHOD OF TRAINING NEURAL NETWORKS AND ESTIMATING REGRESSION MODELS

(76) Inventor: James Ting-Ho Lo, 10210 Sunway Ter., Ellicott City, MD (US) 21042

( * ) Notice: Subject to any disclaimer, the term of this patent is extended or adjusted under 35 U.S.C. 154(b) by 747 days.

(21) Appl. No.: 10/193,984

(22) Filed: Jul. 13, 2002

(65) Prior Publication Data

US 2004/0015461 A1     Jan. 22, 2004

(51) Int. Cl.
*G06N 3/08* (2006.01)
(52) U.S. Cl. .......................................... 706/25; 706/16
(58) Field of Classification Search .................... 706/2, 706/12–16, 19, 25, 39, 49, 50, 61
See application file for complete search history.

(56) References Cited

U.S. PATENT DOCUMENTS

| | | | | |
|---|---|---|---|---|
| 4,918,618 A | * | 4/1990 | Tomlinson, Jr. ............... | 706/25 |
| 5,113,483 A | * | 5/1992 | Keeler et al. ................. | 706/25 |
| 5,390,285 A | * | 2/1995 | Wood ............................ | 706/25 |
| 5,479,574 A | * | 12/1995 | Glier et al. .................... | 706/25 |
| 5,724,487 A | * | 3/1998 | Streit ........................... | 706/25 |
| 6,018,728 A | | 1/2000 | Spence et al. | |
| 6,247,001 B1 | | 6/2001 | Tresp et al. | |
| 6,269,351 B1 | | 7/2001 | Black | |

\* cited by examiner

*Primary Examiner*—Joseph P. Hirl
*Assistant Examiner*—Omar F. Fernández Rivas

(57) ABSTRACT

A method of training neural systems and estimating regression coefficients of regression models with respect to an error criterion is disclosed. If the error criterion is a risk-averting error criterion, the invented method performs the training/estimation by starting with a small value of the risk-sensitivity index of the risk-averting error criterion and gradually increasing it to ensure numerical feasibility. If the error criterion is a risk-neutral error criterion such as a standard sum-of-squares error criterion, the invented method performs the training/estimation first with respect to a risk-averting error criterion associated with the risk-neutral error criterion. If the result is not satisfactory for the risk-neutral error criterion, further training/estimation is performed either by continuing risk-averting training/estimation with decreasing values of the associated risk-averting error criterion or by training/estimation with respect to the given risk-neutral error criterion or by both.

20 Claims, 7 Drawing Sheets

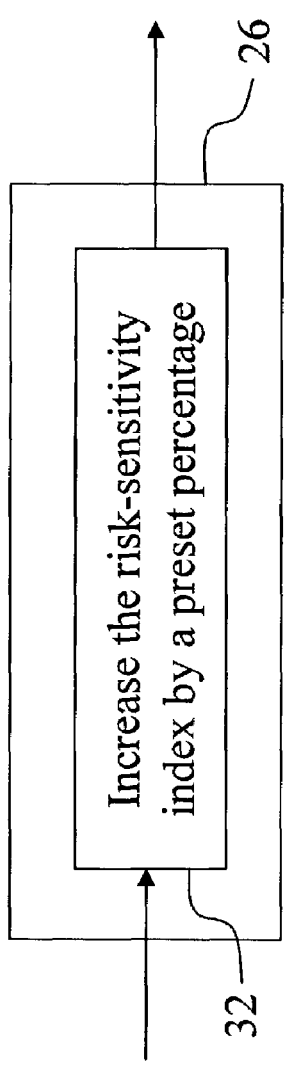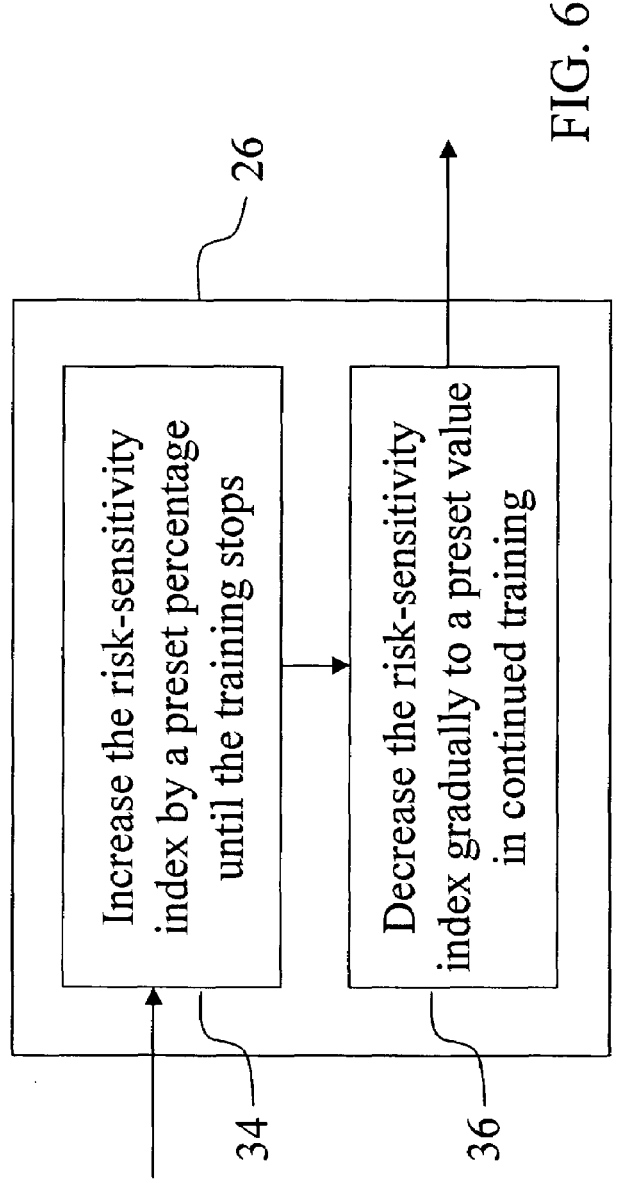

US 7,082,420 B2

CONVEXIFICATION METHOD OF TRAINING NEURAL NETWORKS AND ESTIMATING REGRESSION MODELS

STATEMENT OF GOVERNMENT INTEREST

This invention was made in part with United States Government support. The Government has certain rights in this invention.

CROSS-REFERENCE TO RELATED APPLICATION

This provisional application is related to U.S. Pat. No. 5,987,444 entitled "Robust Neural Systems" granted on 16 Nov. 1999.

BACKGROUND OF THE INVENTION

This invention is concerned with training neural systems and estimating regression models. The invention is applicable to neural systems comprising either a neural network or a neural network and a preprocessor and/or a postprocessor and to regression models that are either mathematical functions or dynamical systems, whose input and output variables are either continuous or discrete or both. Neural systems, neural networks and regression models are hereinafter referred to as NSs, NNs and RMs respectively. "Estimating regression models" means estimating regression coefficients of regression models, which is also called "training regression models" and "estimating regression models." Neural systems and neural networks herein considered are artificial neural systems and artificial neural networks respectively. Neural networks and nonlinear regression models have been applied to control, communication, robotics, geophysics, sonar, radar, economics, financial markets, signal/speech/image processing, etc.

Neural networks are trained and nonlinear regression models are estimated usually through the minimization of an error criterion. The error criterion used is usually a nonconvex function of weights of the neural network under training or regression coefficients of the nonlinear regression model under estimation. The nonconvexity of the error criterion may cause a local-search optimization procedure to produce a poor local minimizer of the error criterion. Since a good global optimization method does not exist in the prior art and a local-search optimization method is usually used, avoiding poor local minima of the nonconvex error criterion has been a major concern with training neural networks and estimating nonlinear regression models.

A common practice for avoiding poor local minima of the error criterion is to repeat a local-search optimization procedure a certain number of times with different initial guesses of the weights or regression coefficients and selecting the neural network or nonlinear regression model that has a smallest value of the error criterion. This involves a large amount of computation, and the selected neural network or nonlinear regression model may still be far from being optimal with respect to the error criterion. Therefore, a method of training neural networks and estimating nonlinear regression models that is able to avoid poor local minima is highly desirable.

In a recent U.S. Pat. No. 5,987,444 entitled "Robust Neural Systems" granted 16 Nov. 1999, a robust neural system for robust processing was disclosed for averting unacceptably large or disastrous processing errors. The training methods described in U.S. Pat. No. 5,987,444 are often numerically infeasible, especially if the value of the risk-sensitivity index of the risk-averting error criterion used is large. A method of training neural networks and estimating nonlinear regression models into robust neural systems and regression models, that is numerically feasible and effective, is also highly desirable.

A new method of training neural networks and estimating nonlinear regression models and its variants are herein disclosed, that have the ability to avoid poor local minima and/or produce robust neural systems.

SUMMARY

A method of training a neural system, either comprising a neural network or comprising a neural network and a preprocessor or a postprocessor, is disclosed. The method comprises steps of evaluating a risk-averting error criterion; adjusting at least one weight of said neural system to reduce a value of said risk-averting error criterion; and adjusting a risk-sensitivity index of said risk-averting error criterion. A risk-averting error criterion is an error criterion that comprises an exponential function of an output of said neural system. The disclosed method usually starts with a relatively small value of the risk-sensitivity index and gradually increases it whenever necessary in the training process. The risk-sensitivity index can also be adjusted by centering and bounding the exponents in the risk-averting error criterion.

Another disclosed method of training a neural system comprises a step of training a neural system with respect to a risk-averting error criterion and a step of training said neural system with respect to a risk-neutral error criterion such as a sum-of-squares error criterion. The method usually completes the former step first and then continue with the latter step using the weights of the neural system obtained from the former step as an initial guess in a local-search optimization procedure. The former step is usually performed by steps of evaluating a risk-averting error criterion; adjusting at least one weight of said neural system to reduce a value of said risk-averting error criterion; and adjusting a risk-sensitivity index of said risk-averting error criterion. Here the step of adjusting a risk-sensitivity index of said risk-averting error criterion is usually performed by starting with a relatively small value of the risk-sensitivity index and gradually increases it whenever necessary in the training process. The risk-sensitivity index can also be adjusted by centering and bounding the exponents in the risk-averting error criterion.

Furthermore, a method of estimating a regression model is disclosed. The method comprises steps of evaluating a risk-averting error criterion; adjusting at least one regression coefficient of said regression model to reduce a value of said risk-averting error criterion; and adjusting a risk-sensitivity index of said risk-averting error criterion. A risk-averting error criterion is an error criterion that comprises an exponential function of an output of said regression model. The disclosed method usually starts with a relatively small value of the risk-sensitivity index and gradually increases it whenever necessary in the training process. The risk-sensitivity index can also be adjusted by centering and bounding the exponents in the risk-averting error criterion.

Another disclosed method of estimating a regression model comprises a step of estimating said regression model with respect to a risk-averting error criterion and a step of estimating said regression model with respect to a risk-neutral error criterion such as a sum-of-squares error criterion. The method usually completes the former step first and then continue with the latter step using the regression coefficients of said regression model obtained from the former step as an initial guess in a local-search optimization procedure. The former step is usually performed by steps of evaluating a risk-averting error criterion; adjusting at least one regression coefficient of said regression model to reduce a value of said risk-averting error criterion; and adjusting a risk-sensitivity index of said risk-averting error criterion. Here the step of adjusting a risk-sensitivity index of said risk-averting error criterion is usually performed by starting with a relatively small value of the risk-sensitivity index and gradually increases it whenever necessary in the training process. The risk-sensitivity index can also be adjusted by centering and bounding the exponents in the risk-averting error criterion.

DESCRIPTION OF THE DRAWINGS

These and other features, aspects and advantages of the present invention will become better understood with regard to the following description, appended claims, and accompanying drawings where:

Clarification of some terminologies is necessary here: Regression data is also called training data. The phrase "estimating regression coefficients of a regression model" is sometimes replaced with the phrase "training a regression model," and sometimes with the phrase "estimating a regression model." "Fitting a regression model to a regression data set" is also expressed as "training a regression model on a training data set."

Figure 1:
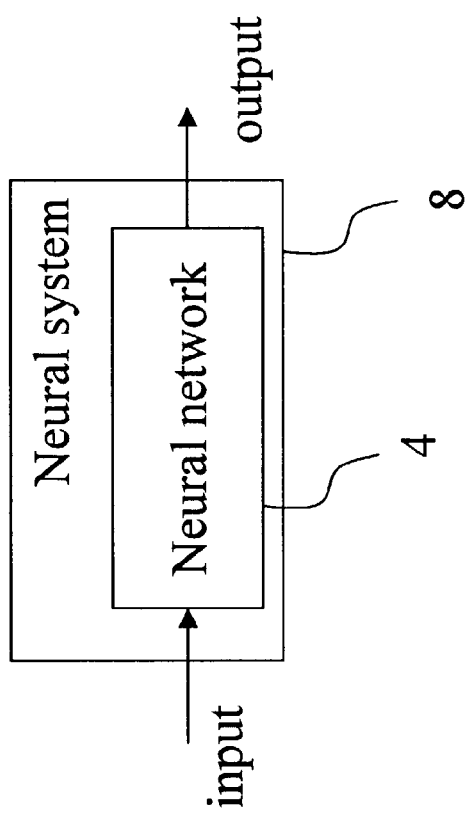
FIG. 1 shows a neural system 8 comprising a neural network 4.
Figure 2:
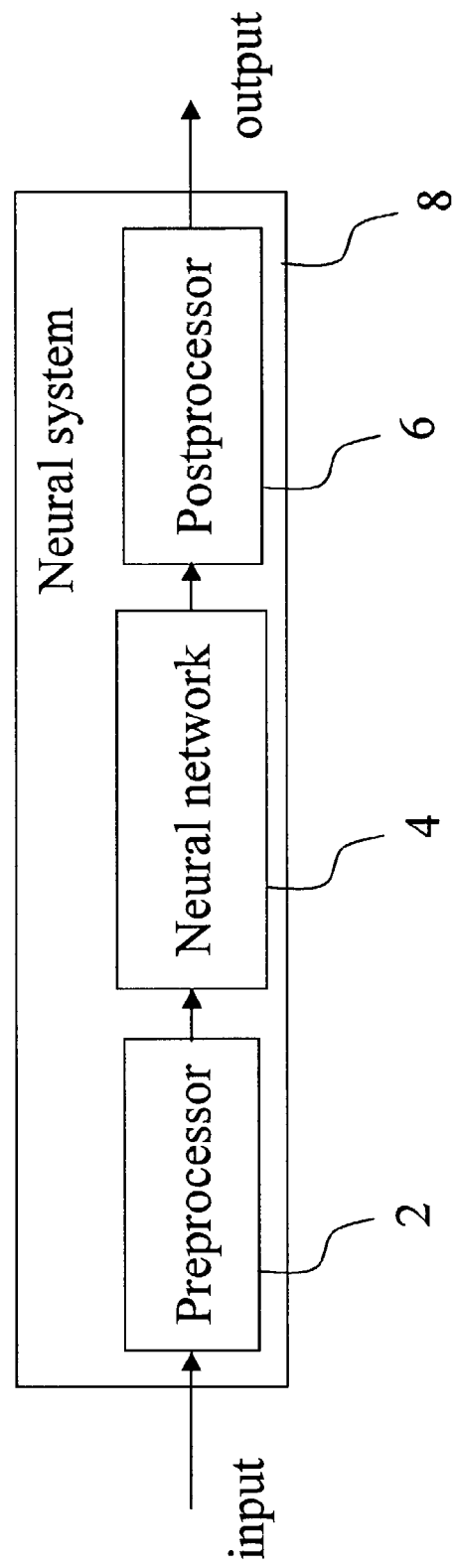
FIG. 2 shows a neural system 8 comprising a neural network 4, a preprocessor 2 and a post-processor 6.
Figure 3:
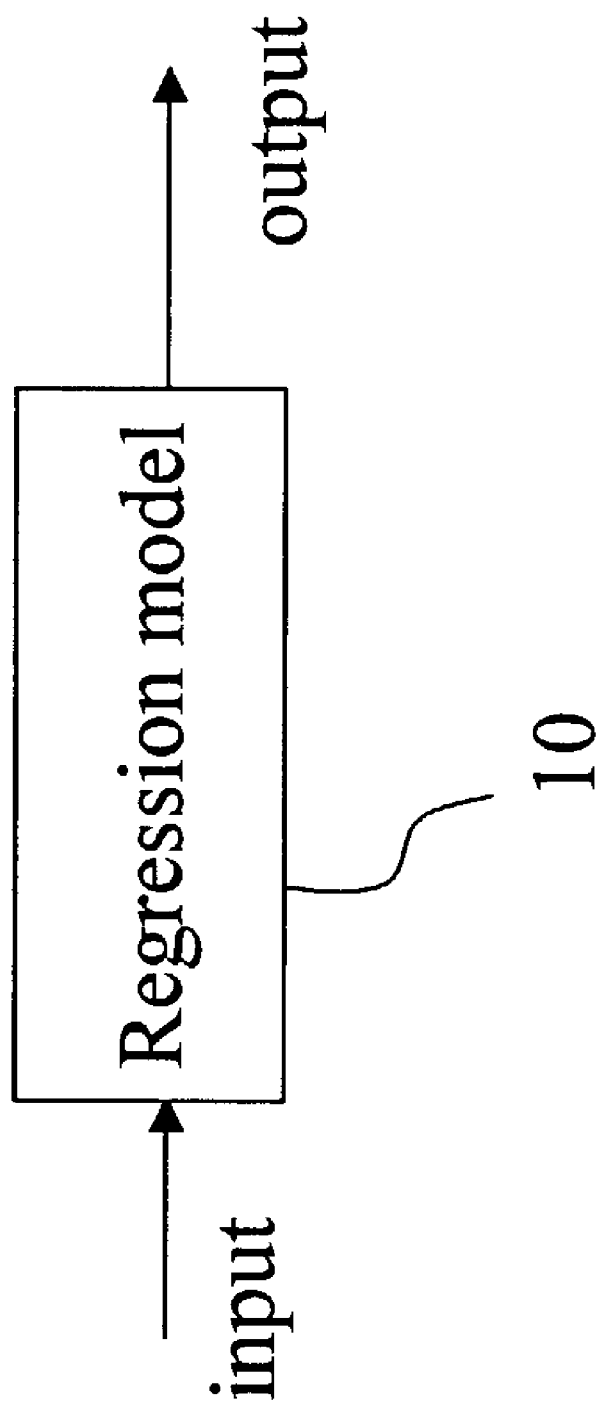
FIG. 3 shows a regression model 10.
Figure 4:
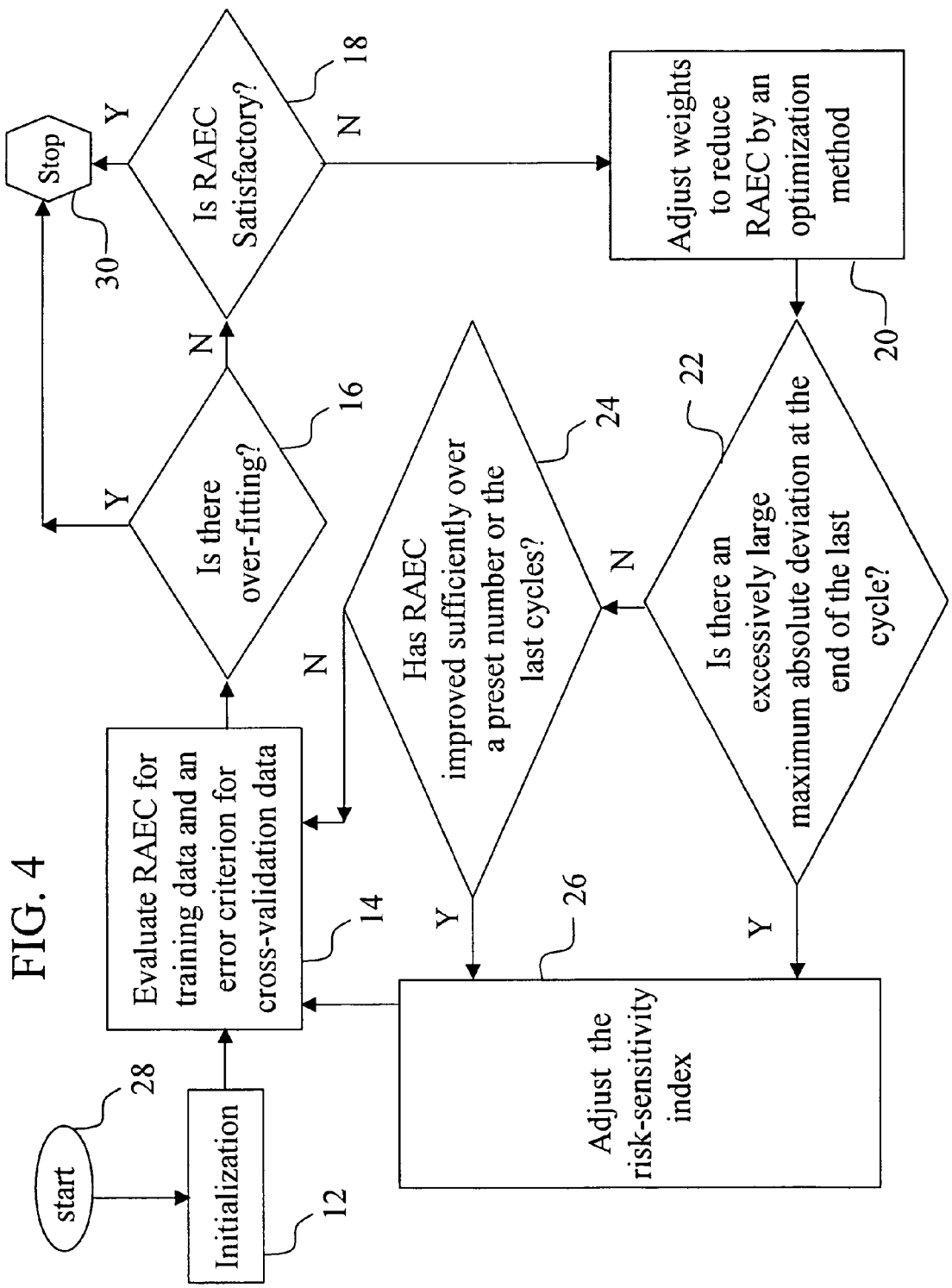

FIG. 4 is a flow chart showing a method of training a neural system or (estimating) a regression model. In the initialization 12, the initial values of such variables, parameters, and coefficients as the initial weights (or coefficients), the initial value of the risk-sensitivity index, and the number of epochs in a cycle are set. The initial values of the variables, parameters and coefficients are usually pseudo-random numbers, and the initial value of the risk-sensitivity index is small. The initialization is followed by the evaluation 14 of a risk-averting error criterion, stood for by RAEC, for the training data and an error criterion for cross-validation data. If over-fitting is detected 16 or the training result is found satisfactory 18 with respect to whatever given criterion, the training is stopped 30.

Otherwise, the weights (or coefficients) of the neural network or regression model under training are adjusted 20 to reduce the RAEC (risk-averting error criterion) by an optimization method. If it is found that the RAEC has improved sufficiently over a preset number of the last cycles 24 or that there is an excessively large maximum absolute deviation at the end of the last cycle 22, the risk-sensitivity index is adjusted 26. Otherwise, the risk-sensitivity index is not changed. This completes one epoch, and a new epoch is started by the evaluation of the RAEC 14.

FIG. 5 shows that the adjustment of the risk-sensitivity index 26 in FIG. 4 comprises a step of increasing it by a preset percentage 32.

FIG. 6 that the adjustment of the risk-sensitivity index 26 in FIG. 4 comprises a step 34 of increasing it by a preset percentage until the training stops 30, as shown in FIG. 4, followed by a step 36 of decreasing the risk-sensitivity index gradually to its preset value in restarting the training from evaluating the RAEC 14, as shown in FIG. 4.

Figure 7:
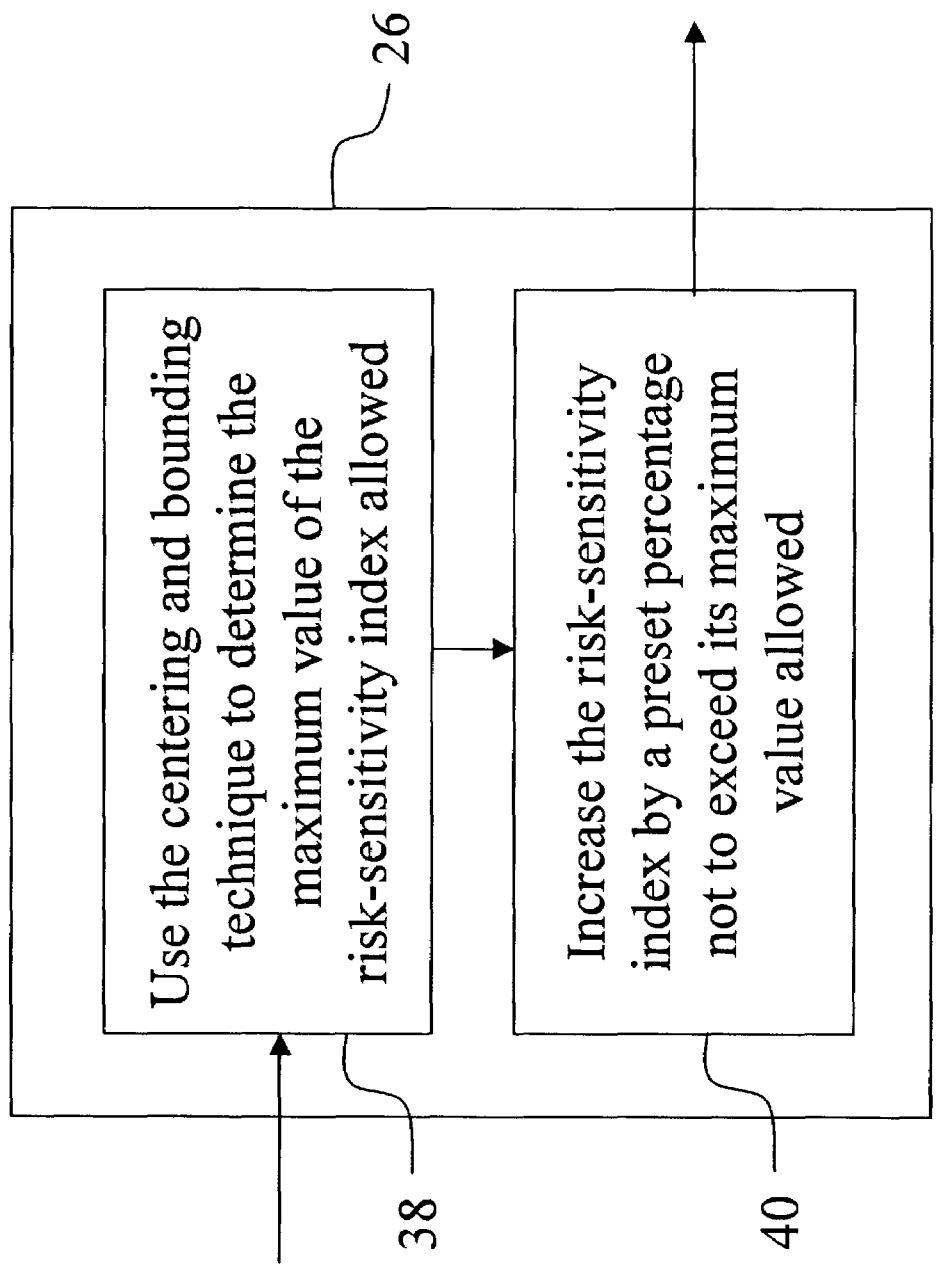

FIG. 7 shows that the adjustment of the risk-sensitivity index 26 in FIG. 4 comprises a step 38 of determining the maximum value of the risk-sensitivity index allowed to ensure numerical feasibility by centering and bounding exponents in the RAEC and a step 40 of increasing the risk-sensitivity index by a preset percentage under the constraint that its maximum value allowed is not exceeded.

Figure 8:
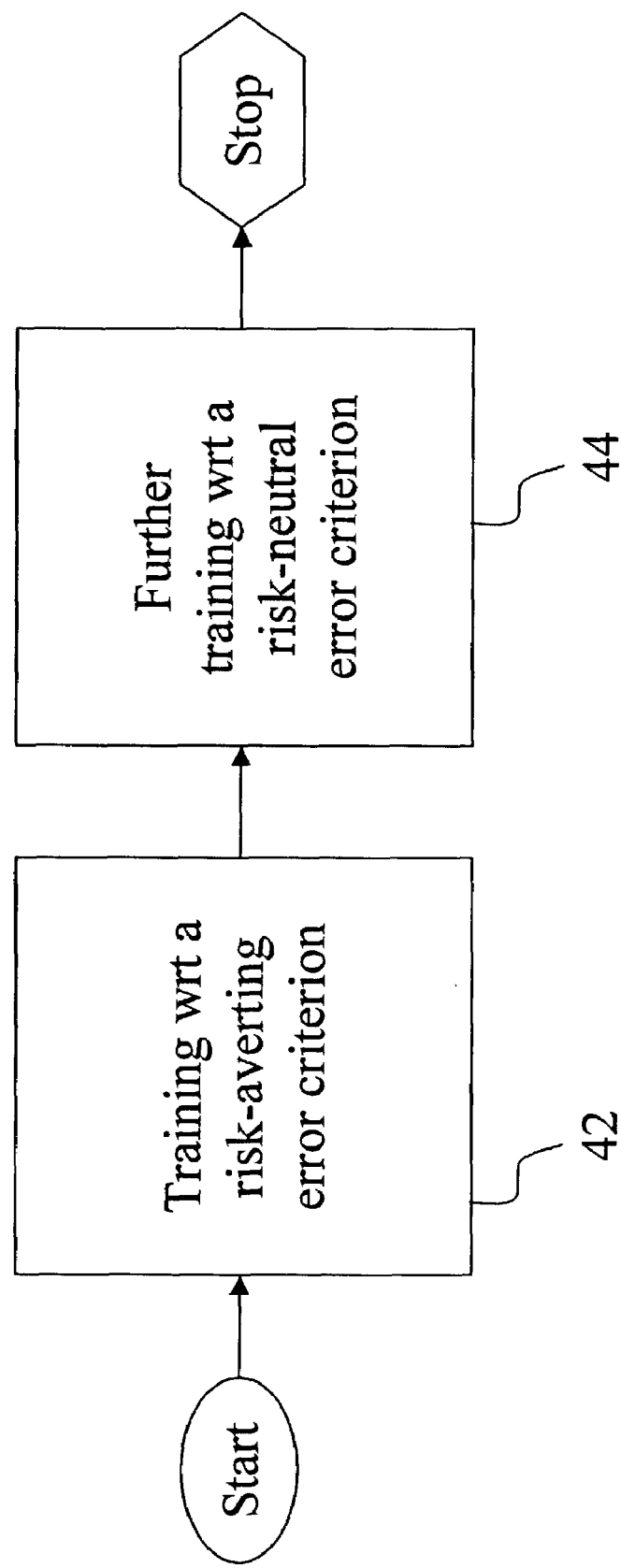

FIG. 8 shows a method of training a neural system or (estimating) a regression model with respect to a risk-neutral error criterion. The method comprises two stages, 42 and 44. In the first stage 42, the training is performed with respect to a risk-averting error criterion that is associated with the given risk-neutral error criterion, whose risk-sensitivity index is usually determined adaptively to suit the training data during the first stage 42. In the second stage 44, the neural system or (estimating) regression model is further trained (e.g. estimated) with respect to the given risk-neutral error criterion.

Figure 9:
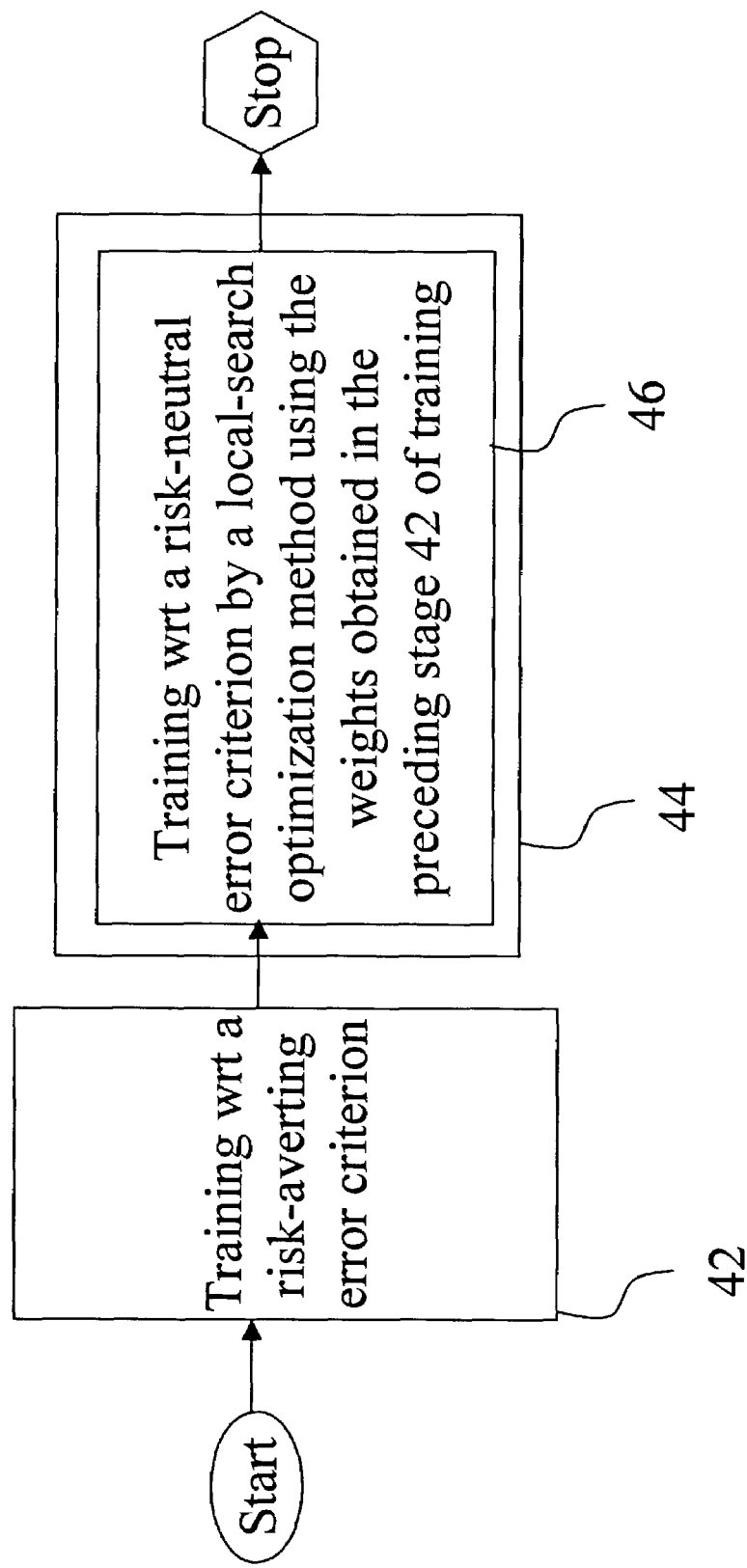

FIG. 9 shows that the second stage 44 of the method shown in FIG. 8 is performed by a local-search optimization method using the weights (e.g. regression coefficients) obtained in the first stage 42 as the initial guess.

DESCRIPTION OF PREFERRED EMBODIMENTS

U.S. Pat. No. 5,987,444 is hereby incorporated by reference and made a part of this disclosure. Terminologies defined in U.S. Pat. No. 5,987,444 are valid in this disclosure. However, if a terminology is herein redefined, the new definition of terminology supersedes the old from U.S. Pat. No. 5,987,444.

A noun in its plural form is sometimes used to encompass both the singular and plural forms of the same noun for brevity. The symbol ":=" means "is defined to be." A vector is an n-tuple of real numbers, where n is a positive integer. A scalar is a one-dimensional vector. A vector-valued variable is a single-dimensional or a multiple-dimensional variable. A process is an ordered sequence of vector-valued variables with the same dimension. A sequence index is called time and denoted by t and takes on nonnegative integer values 1, 2, . . . T, where T is a finite positive integer or infinity. There may or may not be a mathematical/statistical model for the process, which governs the evolution of the process. There may or may not be any knowledge about the relationship among the components of each vector-valued variable of the process or among the vector-valued variables at different times. A realization of a process is a sequence of the consecutive vector values of the process. If two processes denoted by x(t) and y(t), for t=1, 2, . . . , T, respectively, are related by a known and fixed function $f$ such that y(t)=$f$(x(t)) for t=1, 2, . . . , T, then the function $f$ is called a static transformer of the x process. If y(t) at a current time t depends not only on x(t) but also on a preceding value, say x(t−1), of the x process, and/or on the current and/or preceding value(s) of another process, then the mapping, transversal or recursive, that effects this transformation from the x process to the y process is called a dynamic transformer of the x process.

Descriptions of neural networks and their elements and structures; example neural network paradigms; robust neural systems with only nonadaptively adjustable weights; environmental parameters and robust adaptive neural systems; and robust adaptive neural systems can be found in U.S. Pat. No. 5,987,444.

A regression model is a mathematical/statistical model (or description) of an input-output relationship, which model is completely specified except at least one parameter, which is called a regression coefficient. Regression coefficients of a regression model are also called parameters or weights of the regression model. Input variables and output variables of a regression model are also called regressor variables and response variables respectively of the same. Values of regressor variables and response variables of a regression model are also called inputs and outputs respectively of the same. Usually, regressor variables and response variables are continuous. In this invention disclosure, regressor variables and response variables can be either continuous or discrete or partly continuous and partly discrete. Regression data is also called training data. The phrase "estimating regression coefficients of a regression model" is sometimes replaced with the phrase "training a regression model," and sometimes with the phrase "estimating a regression model." "Fitting a regression model to a regression data set" is also expressed as "training a regression model on a training data set."

In the literature, regression and classification problems are usually treated separately. However, we note that using the foregoing definition of a regression model, both the regression and classification problems are problems of estimating the regression coefficients of a regression model. Therefore, there is no distinction between classification and regression in this disclosure.

To unify our disclosure of and discussion on both training neural networks and estimating parameters of regression models, training criteria are hereinafter called error criteria. To distinguish risk-sensitive error criteria with a positive risk-sensitivity index and those with a negative risk-sensitivity index, which de-emphasize large errors instead, the former are hereinafter called risk-averting error criteria. A risk-averting error criterion is an error criterion that comprises an exponential function of the output of the neural network or regression model under training.

A neural system either comprises a neural network or comprises a neural network and a preprocessor or a postprocessor of the neural network. Training a neural system fits it to the training data. In training a neural system, its weights are determined through minimizing or reducing a training criterion, which is actually a data-fitting error criterion. Since a neural system can be viewed as a nonparametric nonlinear regression model, training a neural system can be viewed as estimating the regression coefficients of a nonparametric nonlinear regression model. To simplify the descriptions in this invention disclosure, we often discuss only neural network training. However, anyone with ordinary skill in the art will recognize that the discussions and descriptions for neural system training are equally valid for regression model estimation, regression models including linear and nonlinear models, parametric and non-parametric models, static (i.e. functional) and dynamical models, classification models and combinations thereof.

The invention disclosed is a method of training neural networks and estimating regression models, which can avoid poor local minima of a nonconvex error criterion used for said training and estimating and/or induce robust performance. To motivate the disclosed method for avoid poor local minima of a nonconvex error criterion, two cases of training a neural network, say a multilayer perceptron, on a training data set are first discussed in the following. Note that when a feedforward neural network such as a multilayer perceptron is trained on a training data set consisting of pairs of an input value and a target output value, it is assumed that there is a functional relation between the input variable and the output variable, of which the pairs in the training data are the values (i.e. realizations) of the input and output variables. Training the multilayer perceptron on the training data is to fit the multilayer perceptron to the data and can be viewed as approximating the function represented by the training data. The two cases, which show why global minima are usually missed by a local-search optimization procedure with respect to a nonconvex error criterion, follow:

Case 1. A function to be approximated with a multilayer perceptron has a fine feature, which refers loosely to an unsmooth part or composition of the function that can be viewed as an add-on to the smoother bulk or main body of the function. A fine feature is usually concentrated on a small part of the domain of the function. If the training data is obtained by sampling the function uniformly over its domain, the fine feature contributes little to such a commonly used error criterion as the sum-of-squares (i.e. least-squares) error criterion. Since it would take a disproportionate amount of "approximating resources" of the multilayer perceptron to approximate the fine feature, the training with respect to such an error criterion may fail to include the fine feature in the multilayer perceptron under training.

Case 2. A segment of the function to be approximated by a multilayer perceptron is grossly under-represented in the training data because the function is far from being uniformly sampled over its domain. Hence, the segment, which may be conspicuous or large in the function, contributes relatively little to such a commonly used error criterion as the sum-of-squares (i.e. least-squares) error criterion, and again, the training with respect to such an error criterion may fail to include the under represented segment in the multilayer perceptron under training.

A dynamical system may have a fine feature or an under-represented segment as well. Most of the difficulties associated with training neural networks with such commonly used error criteria as the sum-of-squares (i.e. least-squares) error criterion seem to be caused by insufficient emphasis on large deviations of outputs of the neural networks from the corresponding target outputs. Then how can we, in the process of training a neural network, single out infrequent but large deviations of the neural network outputs from the corresponding target outputs and squeeze them?

In U.S. Pat. No. 5,987,444, entitled "Robust Neural Systems" granted on 16 Nov. 1999, risk-averting error criteria are proposed for training neural networks into robust processor. A risk-averting error criterion is either an error criterion that comprises an exponential function of some type of the distance between a target output (e.g. an output measurement) and a corresponding output of a neural system or regression model multiplied by a positive parameter denoted by $\lambda$, or an error criterion that comprises an exponential function of some function of at least an output of a neural system or a regression model multiplied by a positive parameter denoted by $\lambda$. The positive parameter is called the risk-sensitivity index of the risk-averting error criterion. By emphasizing large values of the error function or the deviations in an exponential manner, training a neural network with respect to a risk-averting error criterion averts such large values and thereby avoids poor local minima caused by a fine feature or an under-represented segment discussed in the foregoing cases. In fact, it has recently been proven mathematically that as the risk-sensitivity index increases, the region in the weight vector space, in which the risk-averting error criterion, is convex expands monotonically to the entire weight vector space except a subset of the union of a finite number of manifolds of a dimension less than that of the weight vector space.

To facilitate the specification and claims of this invention disclosure, all error criteria that are not a risk-averting error criterion are called risk-neutral error criteria. In other words, a risk-neutral error criterion is an error criterion that does not involve an exponential function of the deviation of a neural network output from a corresponding target output. The foregoing discussion shows that risk-averting error criteria can be used not only to induce robust performance of a neural network as disclosed in U.S. Pat. No. 5,987,444, but also help avoid poor local minima in training a neural network or a regression model. Nevertheless, the training methods described in U.S. Pat. No. 5,987,444 are often numerically infeasible, especially if the value of the risk-sensitivity index of the risk-averting error criterion used is large. The invention disclosed herein is a numerically feasible and effective method of training neural networks and estimating regression models using risk-averting error criteria. The disclosed method and its variants can produce neural networks and regression models that are optimal or nearly optimal with respect to a given risk-neutral error criterion or a given risk-averting error criterion.

Before we describe some preferred embodiments of the invented training method, let us first examine some exemplary risk-neutral error criteria and some exemplary risk-averting error criteria and describe a method of training neural systems and estimating regression models that makes use of a risk-averting error criterion with the value of its risk-sensitivity index $\lambda$ adjusted adaptively to avoid local minima of the given original error criterion. It has been proven that the domain, on which a risk-averting error criterion with p=2, is strictly convex, expands as the risk-sensitivity index $\lambda$ increases. This can be looked upon as "convexification" of the original error criterion. Therefore, the method is called convexification method. Because, the risk-averting error criterion is used and its risk-sensitivity index is adaptively selected in the process of convexification, the convexification method is also called risk-averting method and adaptive risk-averting method. We note that none of the prior-art methods of training neural networks or estimating regression models changes the original error criterion. Convexifying the original error criterion is a distinct characteristic that sets the convexification method apart from the prior art.

Risk-Neutral and Risk-Averting Error Criteria

For approximating an underlying m-vector-valued function $f(x)$, let us denote the output of a neural system or the response variable of a regression model, with a weight vector w, that has just received and processed an n-vector-valued input or independent variable x by $\hat{f}(x, w)$. $\hat{f}(x, w)$ denotes also the neural network with the weight vector w or the regression model with the regression coefficient vector w. A risk-neutral error criterion, called an $L_p$ error criterion, is $$L_p(w) = \frac{1}{K}\sum_{k=1}^{K} \|y_k - \hat{f}(x_k, w)\|_p^p \quad (1)$$

and a risk-averting error criterion of order ($\lambda$, p) is defined as $$J_{\lambda,p}(w) = \frac{1}{K}\sum_{k=1}^{K} \exp[\lambda \|y_k - \hat{f}(x_k, w)\|_p^p] \quad (2)$$

where $\|\cdot\|_p$ is the $L_p$ norm in $R^m$, and $\{(x_k, y_k): k=1, \ldots K\}$ is the training or regression data set, in which $y_k$ denotes the output measurement corresponding to the input $x_k$. $y_k$ and $x_k$ are related by $y_k = f(x_k) + \epsilon_k$, where $\epsilon_k$ is the output measurement noise. If $\epsilon_k$ is identically zero, then $y_k = f(x_k)$ and the measurement noise is said to be non-existent. A most important special case is $J_{\lambda,2}(w)$. Note that $e(k, w) := y_k - \hat{f}(x_k, w)$ is the deviation of the output $\hat{f}(x_k, w)$ of the neural system or the regression model from the corresponding output measurement $y_k$. Note that $\|y_k - \hat{f}(x_k, w)\|_2$ is the standard distance between the output $\hat{f}(x_k, w)$ of the neural system or the regression model with weight vector w and the corresponding output measurement $y_k$. The $L_p$ norm $\|y_k - \hat{f}(x_k, w)\|_p$ in $R^m$ is also a type of distance.

Notice that $J_{\lambda,p}(w)$ is obtained from $L_p(w)$ by simply exponentiating each $L_p$ norm $\|y_k - \hat{f}(x_k, w)\|_p$ in $L_p(w)$. $L_p(w)$ is called the associated risk-neutral error criterion of the risk-averting error criterion $J_{\lambda,p}(w)$, and $J_{80,p}(w)$ is called the associated risk-averting error criterion of the risk-neutral error criterion $L_p(w)$.

Note that the $L_p$ error criterion $L_2(w)$ is a standard sum-of-squares error criterion. The deviation $y_k - \hat{f}(x_k, w)$ of the output $\hat{f}(x_k, w)$ of the neural system or the regression model with weight vector w from the corresponding output measurement $y_k$ (is sometimes denoted by e(k, w). Using this notation, an important alternative to $J_{\lambda,2}(w)$ $$J_\lambda(w) = \frac{1}{K}\sum_{k=1}^{K} \exp[\lambda e^T(k, w) Q e(k, w)] \quad (3)$$

where Q is a positive definite matrix. However, if $y_k$, $\hat{f}(x_k, w)$ and e(k, w) are transformed into $Q^{1/2} y_k$, $Q^{1/2} \hat{f}(x_k, w)$ and $Q^{1/2} e(k, w)$ respectively, $J_\lambda(w)$ in (3) is transformed into $J_{\lambda,2}(w)$ in (2).

In some applications, the cost of a deviation $y_k - \hat{f}(x_k, w)$ depends on the output measurement $y_k$ involved. In such a case, an exemplary risk-averting error criterion is $$J_\lambda(w) = \frac{1}{K}\sum_{k=1}^{K} \exp[\lambda \varphi(y_k) e^T(k, w) Q e(k, w)] \quad (4)$$

where $\phi(y_k)$ is a weighting function used to reflect the relative costs of different $y_k$.

If the error that the neural system or the regression model causes for an application for the input $x_k$ is a function $\rho(z_k, \hat{f}(x_k, w))$ of $\hat{f}(x_k, w)$ and $z_k$, that is an effect of the input $x_k$ on the operating environment of the neural system or the regression model, then a risk-neutral error criterion is $$L(w) = \frac{1}{K} \sum_{k=1}^{K} \rho(z_k, \hat{f}(x_k, w)) \quad (5)$$

and a risk-averting error criterion is $$J_\lambda(w) = \frac{1}{K} \sum_{k=1}^{K} \exp[\lambda \rho(z_k, \hat{f}(x_k, w))] \quad (6)$$

For instance, such error criteria are useful for using a feedforward neural network as a controller whose output $\hat{f}(x_k, w)$ is the control input of a dynamical system, which in turn outputs $z_k$. The error criteria, (5) and (6), are called the associated error criteria of each other.

For approximating an underlying dynamical system, $$z_k = f(z_{k-1}, \ldots, z_{k-s}, x_k, \ldots, x_{k-q}, \xi_k) \quad (7)$$

where $x_k$ and $z_k$ are the n-vector-valued input process and m-vector-valued output process of the dynamical system; s and q are two positive integers; and $\xi_k$ denotes a random driver process, we denote the output of the recurrent neural system with a weight vector w or the response of a dynamical regression model with a parameter vector w (i.e. vector of regression coefficients), that has been initialized (i.e. with the initial dynamical state of the neural system or regression model set properly) for time 0 and has received the input sequence, $$x^i := [x_i^T, \ldots, x_{i-r}^T]^T,$$

$i=1, \ldots, k$, one at a time, by $\hat{f}(x^k, w)$. If the random driver process $\xi_k$ is identically zero, the dynamical system is called a deterministic dynamical system. Let $\hat{f}(x^k, w)$ denote also the recurrent neural system or the dynamical regression model. Here r denotes a preselected integer. If r is greater than 0, tapped delay lines are used to hold $x^i$ as the input vector to the recurrent neural system or the dynamical regression model for time i. Then a risk-neutral error criterion, called an $L_p$ error criterion, is $$L_p(w) \frac{1}{K|S|} \sum_{\omega \in S} \sum_{k=1}^{K} \|y_k(\omega) - \hat{f}(x^k(\omega), w)\|_p^p \quad (8)$$

and a risk-averting error criterion of order $(\lambda, p)$ is defined as $$J_{\lambda,p}(w) = \frac{1}{K|S|} \sum_{\omega \in S} \sum_{k=1}^{K} \exp[\lambda \|y_k(\omega) - \hat{f}(x^k(\omega), w)\|_p^p] \quad (9)$$

where $|S|$ is the number of elements in S, and $\{(x^k(\omega), y_k(\omega)): k=1, \ldots, K, \omega \in S\}$ denotes the training data, in which $y_k(\omega)$ denotes the output measurement corresponding to the input $x^k(\omega)$ for time k in the sample sequence (or sampled realization) $\omega$. $y_k$ and $z_k$ are related by $y_k = z_k + \epsilon_k$, where $\epsilon_k$ is the output measurement noise. Note that $e(k, w, \omega) := y_k(\omega) - \hat{f}(x^k(\omega), w)$ is the deviation of the output $\hat{f}(x^k(\omega), w)$ of the neural system or the regression model from the corresponding output measurement $y_k(\omega)$. If $\epsilon_k$ is identically zero, then $y_k = z_k$ and the measurement noise is said to be non-existent. A most important special case is $J_{\lambda,2}(w)$. The error criteria, (8) and (9), are called the associated error criteria of each other.

If the cost of a deviation $y_k(\omega) - \hat{f}(x^k(\omega), w)$ depends on the output measurement $y_k(\omega)$ involved, an exemplary risk-averting error criterion is $$J_{\lambda,p}(w) = \frac{1}{K|S|} \sum_{\omega \in S} \sum_{k=1}^{K} \exp[\lambda \varphi(y_k(\omega)) \|y_k(\omega) - \hat{f}(x^k(\omega), w)\|_p^p] \quad (10)$$

where $\phi(y_k(\omega))$ is a weighting function used to reflect the relative costs of different $y_k(\omega)$.

An alternative to $J_{\lambda,p}(w)$ in (9) is $$J_{\lambda,p}(w) = \frac{1}{K|S|} \sum_{\omega \in S} \exp \sum_{k=1}^{K} [\lambda \|y_k(\omega) - \hat{f}(x^k(\omega), w)\|_p^p] \quad (11)$$

If the error that the neural system or the regression model causes for an application for the input $x_k$ is a function $\rho(z_k, \hat{f}(x_k, w))$ of $\hat{f}(x_k, w)$ and $z_k$, that is an effect of the input sequence $x_k$ on the operating environment of the neural system or the regression model, then a risk-neutral error criterion is $$L(w) = \frac{1}{K|S|} \sum_{\omega \in S} \sum_{k=1}^{K} \rho(z_k(\omega), \hat{f}(x^k(\omega), w)) \quad (12)$$

and a risk-averting error criterion is $$J_\lambda(w) = \frac{1}{K|S|} \sum_{\omega \in S} \sum_{k=1}^{K} \exp[\lambda \rho(z_k(\omega), \hat{f}(x^k(\omega), w))] \quad (13)$$

where $x^k(\omega)$ and $Z_k(\omega)$ denote the neural system input and the corresponding effect for time k in the sample sequence $\omega$. For instance, such a risk-averting criterion is useful for using a recurrent neural network as a controller whose output $\hat{f}(x_k, w)$ is the control input of a dynamical system, which in turn outputs $z_k$.

An example of the function or distance is the squared deviation $$\|y_k(\omega) - \hat{f}(x^k(\omega), w)\|_2^2$$

of the output of the neural system or the regression model from the corresponding output measurement. We repeat that a risk-averting error criterion is either an error criterion that comprises an exponential function of some type of distance between an output measurement and a corresponding output of a neural system or a regression model multiplied by a positive parameter denoted by $\lambda$, or an error criterion that comprises an exponential function of some function of at least an output of a neural system or a regression model multiplied by a positive parameter denoted by $\lambda$. We repeat also that the positive parameter $\lambda$ is called the risk-sensitivity index of the risk-averting error criterion.

It is understood that many equivalent forms of the order-$(\lambda, p)$ risk-averting error criteria exist. For instance, $$q_{\lambda,2}(w) = \frac{1}{K}\sum_{k=1}^{K} c^{\left[\lambda\|y_k - \hat{f}(x_k, \omega)\|_2^2\right]} \quad (14)$$

comprises the exponential function $$c^{\left[\lambda\|y_k - \hat{f}(x_k, \omega), w\|_2^2\right]}$$

of the squared distance $$\|y_k - \hat{f}(x_k, \omega), w\|_2^2$$

between the output measurement $y_k$ and the output $\hat{f}(x_k, w)$ of a neural system or a regression model multiplied by the risk-sensitivity index $\lambda$. By the definition of a risk-averting error criterion, $q_{\lambda,2}(w)$ in (14) is a risk-averting error criterion.

Multiplying a risk-averting error criterion by a normalizing constant or any constant yields another risk-averting error criterion. In fact, anyone with an ordinary skill in the art can use the definition of a risk-averting error criterion to construct or identify innumerable variants of risk-averting error criteria.

Training/Estimating wrt Risk-Averting Error Criteria

A risk-averting error criterion emphasizes large deviations of outputs of a neural system or a regression model from corresponding output measurements in an exponential manner, and whereby avert unacceptable or disastrous deviations and whereby induces robust performance of the neural system or the regression model. Obviously, the larger the risk-sensitivity index $\lambda$ is, the more the large deviations are emphasized.

It has recently been proven that the domain, on which a risk-averting error criterion, (3) or (9) with $p=2$, is strictly convex, expands as the risk-sensitivity index $\lambda$ increases. It has also been proven that increasing the risk-sensitivity index during training a neural network or estimating the regression coefficients of a regression model reduces the maximum absolute deviations of the outputs of the neural network or the regression model from the corresponding target outputs.

Therefore, using risk-averting error criteria in training a neural network or estimating a regression model has the dual benefits of avoiding poor local minima and inducing robust performance. However, the methods described in U.S. Pat. No. 5,987,444 for training neural networks with respect to a risk-averting error criterion with a fixed value of the risk-sensitivity index are often numerically infeasible, especially if the value of the risk-sensitivity index of the risk-averting error criterion used is large. The numerical infeasibility is caused by the excessively large numbers involved in evaluating the risk-averting error criterion, which is usually a sum of exponential functions.

If a neural network is to be trained (or a regression model is to be estimated) with respect to a risk-averting error criterion with a given value of the risk-sensitivity index $\lambda$, we train, in an embodiment of the invention herein disclosed, the neural network (or estimate a regression model) with respect to the risk-averting error criterion by starting with a small value of $\lambda$ and gradually increasing the value of $\lambda$ to the given value. At the beginning of the training, the squared errors are large, the value of $\lambda$ is set so small that the squared errors multiplied by $\lambda$ are so small that their exponentiated values are still small enough for the computer to handle. In the process of training, the squared errors decrease, and the value of $\lambda$ is allowed to be gradually increased without causing a value of an exponential function in the risk-averting error criterion to be so large that cannot be handled by the computer. The centering and bounding techniques discussed in the sequel can also be used to keep the exponents in the risk-averting error criterion manageable by the computer.

If a neural network is to be trained with respect to a risk-neutral error criterion, we train, in another embodiment of the invention herein disclosed, the neural network (or estimate a regression model) by employing the risk-averting error criterion associated with the given risk-neutral error criterion. The risk-sensitivity index $\lambda$ of the associated risk-neutral error criterion is set to be a small value at the beginning of the training and gradually increased to a selected value suitable for the training data. A convexification method that adaptively selects the value of $\lambda$ will be described momentarily. If a neural network is to be trained with respect to a risk-averting error criterion without a given value of the risk-sensitivity index $\lambda$, the convexification method can also be applied.

After the training by the convexification method is completed, if the exponents in the associated risk-averting error criterion (e.g. products of the risk-sensitivity index and the squared errors $$\lambda\|y_k - \hat{f}(x_k, \omega)\|_2^2,$$

for $k=1, \ldots, K$) are so small that the exponential functions $$\left(\text{e.g. } \exp\left[\lambda\|y_k - \hat{f}(x_k, \omega)\|_2^2\right]\right)$$

are very close to 1 plus the exponents $$\left(\text{e.g. } 1 + \lambda\|y_k - \hat{f}(x_k, \omega)\|_2^2\right),$$

then minimizing the associated risk-averting error criterion, such as (2), is close to minimizing the original risk-neutral error criterion $$\left(\text{e.g. } \frac{1}{K}\sum_{k=1}^{K}\|y_k - \hat{f}(x_k, \omega)\|_2^2\right).$$

However, if the exponents in the associated risk-averting error criterion are not small, and the associated risk-averting error criterion is not very close to the associated risk-neutral error criterion plus 1, then the neural network obtained from training with respect to the associated risk-averting error criterion is usually not good enough for the original risk-neutral error criterion. Further training with respect to the original risk-neutral error criterion is necessary and discussed in the sequel.

We now describe the foregoing convexification method:

If there are output measurement noises $\epsilon_k \neq 0$ in the training data, too large a risk-sensitivity index may over-emphasize large output measurement noises and distort the neural system or regression model under training. Moreover, too large a risk-sensitivity index may cause numerical problems, when the deviations of outputs of a neural system or a regression model from corresponding output measurements are large.

Therefore, the value of the risk-sensitivity index $\lambda$ must be small enough not to cause much of these noise-fitting and numerical problems, but large enough to induce robust performance of the neural system or regression model under training. Then how should the value of $\lambda$ in a risk-averting training criterion be chosen for a training data set?

The disclosed convexification method of training neural networks and estimating regression models selects the value of the risk-sensitivity index $\lambda$ adaptively and determines the weight vector of the neural network under training or the regression model under estimation that is optimal or nearly optimal with respect to the risk-averting error criterion with the selected value of $\lambda$.

At the beginning of a training (or estimation) session, the neural network under training or the regression model under estimation has not experienced much training, and the deviations (e.g. e(k, w) in (2) and e(k, w, ω) in (9)) are usually very large in absolute value. A large initial value of $\lambda$ often causes numerical problem in the training. Besides, we do not want to start with a value of $\lambda$ that is already larger than necessary for the purpose of using a risk-averting error criterion. From these two points of view, we should start the training with a small value of $\lambda$.

After an initial value of $\lambda$ is selected and then after a certain number, say 100, of training epochs, an epoch being an adjustment of all the weights of the neural system or the regression model for the entire training data set, if there is still an absolute deviation $d_k$ (e.g. $d_k := |y_k - \hat{f}(x_k, w)|$ in (2) and $d_k := |y_k(\omega) - \hat{f}(x^k(\omega), w)|$ in (9)) that is unacceptably large, then the value of $\lambda$ is increase by a small percentage, say 10% to 20%.

Thereafter, we start and repeat the cycle of the four steps:
1. Perform the same number of training epochs.
2. Check if there is significant change in the risk-sensitive training criterion or the maximum absolute deviation in a certain number of, say three, consecutive cycles.
3. Checking if there is still an "unacceptably large" absolute deviation $d_k$ (e.g. $d_k := |y_k - \hat{f}(x_k, w)|$ in (2) and $d_k := |y_k(\omega) - \hat{f}(x^k(\omega), w)|$ in (9)).
4. If the checking result in step 2 or step 3 is positive, increment the value of $\lambda$ by a small percentage.

Throughout the training, a cross validation procedure is used to monitor the training status. As soon as the cross validation procedure detects over-fitting, the training is stopped. A measure of the status is the maximum of absolute deviations over all the input/output pairs in the cross validation data set V. Another measure is the value of the risk-averting criterion for the cross validation data V. Whenever it becomes clear that a chosen measure starts to increase monotonically, the training is stopped to prevent noise-fitting or data-overfitting. This stopping rule based on cross validation is expected to enable the training method to handle training data with larger unbiased measurement noises.

Of course, the training is also stopped, when $J_{\lambda,p}(w)$ and the standard $L_p$ error criterion decrease at an extremely slow rate or when the required approximation accuracy is achieved.

How do we decide if an absolute deviation $d_k$ (e.g. $d_k := |y_k - \hat{f}(x_k, w)|$ in (2) and $d_k := |y_k(\omega) - \hat{f}(x^k(\omega), w)|$ in (9)) is "unacceptably large?" Note that if a neural system of an adequate size or a regression model is properly trained to approximate $f$, it is reasonable to assume that the deviations, comprising the function approximation errors (e.g. $f(x_k) - \hat{f}(x_k, w)$ in (2) and $y_k(\omega) - \hat{f}(x^k(\omega), w)$ in (9)) and the measurement noises Ek, have an approximately normal distribution. Without knowing if the training is completed and successful, we use the 68 percentile $p_{68\%}$ of the absolute deviations $d_k$, k=1, ..., K, as an estimate of the standard deviation of the deviations excluding those "unacceptably large" deviations. Here it is assumed that the number of training i/o pairs corresponding to the "unacceptably large" deviations do not exceed 32% of the training data. Under the normal distribution assumption, the probability of an absolute deviation $d_k$ exceeding $3p_{68\%}$ is 0.0026. This probability is so small that an absolute deviation $d_k$ exceeding $3p_{68\%}$ is regarded as "unacceptably large." Of course, 68 percentile and the threshold $3p_{68\%}$ can be changed to suit special applications.

As mentioned above, every time the value of $\lambda$ is increased, it is increased by a small amount. The amount must be small to avoid $\lambda$ leaping to an unnecessarily large value, which may cause numerical infeasibility or improper emphasis on the largest measurement noises. However, because each increment in the value of $\lambda$ is small, its effect on the training may not show until after more than a couple of increments. Therefore, we do not stop incrementing the value of $\lambda$ unless increasing the value of $\lambda$ does not bring about at least a 5 to 10% change in either the value of $$C_{\lambda,p}(w) := \left[\frac{1}{\lambda}\ln J_{\lambda,p}(w)\right]^{\frac{1}{p}}$$

or the value of the maximum absolute deviation in a certain number, say three, consecutive cycles. We examine the change of the value of $C_{\lambda,p}(w)$ instead of that of the risk-sensitive criterion $J_{\lambda,p}(w)$, because the value of $C_{\lambda,p}(w)$ is less affected by the exponentiations involved than $J_{\lambda,p}(w)$ is.

For a given value of the parameter $\lambda$ in the training process, each of the consecutive epochs consists of the standard backpropagation or backpropagation through time to compute the derivatives of the risk-averting error criterion with respect to the weights and a BFGS step to update the estimate of the Hessian matrix and adjust the weights. The cross validation procedure mentioned above monitors the maximum absolute deviation of a cross validation data set V, whose intersection with the training data set S is empty, to avoid noise-fitting or data-overfitting.

To summarize the above description of the preferred embodiment of the disclosed convexification method, a training algorithm for training a neural system or a regression model is described in a pseudo computer program below:

1. //Initialization://
   epoch ← 0.
   Set the initial weights w (0) at random.
   cyclelength ← 100.
   λ ← 5.
   flag2 ← 0.
   flag3 ← 0.
2. //Step 1 of a cycle://
   For t = 1, . . . , cyclelength, do.
      Compute the gradient of $J_{\lambda,p}$ (w) wrt w at w = w (epoch + t − 1) with backprop;
      Update w (epoch + t − 1) to w (epoch + t) with BFGS;
      Apply cross validation and if data-overfitting is detected, go to 7;
   end.
   If the required approximation accuracy is achieved, go to 7.
   If $J_{\lambda,p}$ (w) and $J_{0,p}$ (w) change little for cycles, go to 7.
   epoch ← epoch + cyclelength.
3. // Step 2 of the cycle://
   flag1 ← flag2.
   flag2 ← flag3.
   flag3 ← 0.
   If $C_{\lambda,p}$ (w(epoch)) < 0.95$C_{\lambda,p}$ (w(epoch − cyclelength + 1))

or $\max_{k \in \{1,...,K\}} d_k(\text{epoch}) < 0.95 \max_{k \in \{1,...,K\}} d_k(\text{epoch} - \text{cyclelength}+ 1)$ then flag3 ← 1.
4. //Step 3 of the cycle://
   flag4 ← 0.

If $\max_{k \in \{1,...,K\}} d_k(\text{epoch}) > 3p_{68\%}$ then flag4 ← 1.
5. //Step 4 of the cycle://
   If flag1 = 1 or flag2 = 1 or flag3 = 1 or flag4 = 1 then
      λ ← 1.1λ.
6. //Start another cycle//
   Go to 2.
7. //Exit the program//
   Stop.

It is appropriate to remark here that the above training algorithm is most effective for training data with both inputs and outputs normalized to have the range [−1, 1], and that there are other factors than convexity in selecting the value of λ. The statistics of the measurement noises in the training data, the requirements of the application, and the numerical feasibility are among these factors.

It is noted earlier on that the greater λ is, the larger the domain on which the risk-averting error criterion is convex is. In the following, we determine the maximum λ value that can be properly handled by a given computer without considering other factors. Let the exponents, $$\lambda \|y_k - \hat{f}(x_k, \omega)\|_p^p$$

in (2); $\lambda e^T(k, w)Qe(k, w)$ in (3); $\lambda \rho(z_k, \hat{f}(x_k, w))$ in (6);

$$\lambda \|y_k(\omega) - \hat{f}(x^k(\omega), w)\|_p^p$$

in (9); and $\lambda \rho(z_k(\omega), \hat{f}(x^k(\omega), w))$ in (13); be denoted by $\lambda g(k, w, \omega)$, which may be dependent on k and w only and thus independent of ω. Then a typical term in a risk-averting error criterion is $\exp[\lambda g(k, w, \omega)]$. When $\lambda g(k, w, \omega)$ is too large or too small, $\exp[\lambda g(k, w, \omega)]$ may go beyond the maximum and minimum positive numbers, denoted by $\exp\zeta_2$ and $\exp\zeta_1$ respectively, that the computer can properly do arithmetic with. For instance, $\zeta_1$ and $\zeta_2$ for a Pentium PC are −13 and 13 respectively. The interval $[\exp\zeta_1, \exp\zeta_2]$ may also be the range that we choose to have the arithmetic done within. To best use the range $[\exp\zeta_1, \exp\zeta_2]$, we treat $\exp[\lambda g(k, w, \omega)]$ as $\exp(\lambda b)\cdot\exp[\lambda(g(k, w, \omega)-b)]$ numerically, and determine b and the largest value of λ allowed for the computer as follows.

Obviously, to keep $\exp[\lambda(g(k, w, \omega)-b)]$ within the range $[\exp\zeta_1, \exp\zeta_2]$, we need $\lambda(g(k, w, \omega)-b) \leq \zeta_2$ and $\lambda(g(k, w, \omega)-b) \geq \zeta_1$, or equivalently, $q_{max} - \zeta_2/\lambda \leq b \leq q_{min} - \zeta_1/\lambda$, where $q_{max} := \max_{(k,\omega)}\{g(k, w, \omega)\}$ and $q_{min} := \min_{(k,\omega)}\{g(k, w, \omega)\}$. From $q_{max} - \zeta_2/\lambda \leq q_{min} - \zeta_1/\lambda$, it follows that $\lambda < (\zeta_2 - \zeta_1)/(q_{max} - q_{min})$, which is the maximum value of λ allowed for the computer. Notice that the range of b for a selected λ is $[q_{max} - \zeta_2/\lambda, q_{min} - \zeta_1/\lambda]$. A reasonable choice for b is the middle point $(q_{max}-\zeta_2/\lambda+q_{min}-\zeta_1/\lambda)/2$ of this range, which places $\lambda(q_{min}-b)$ and $\lambda(q_{max}-b)$ equidistant from $(\zeta_2+\zeta_1)/2$ and makes a good use of the range $[\exp\zeta_1, \exp\zeta_2]$.

In the process of training a neural network or estimating a regression model with a Pentium PC or any computer with $\zeta_2+\zeta_1=0$, we may want to set $b=(q_{max}+q_{min})/2$ and select $\lambda \leq 26/(q_{max}-q_{min})$ in consideration of all factors involved and fix them for a certain number of iterations in an iterative algorithm of minimizing $$\left(\frac{1}{K|S|}\right)\sum_{\omega}\sum_{k}\exp[\lambda(g(k, w, \omega) - b)],$$

and repeat. As $q_{max}-q_{min}$ decreases in the training process, $\lambda$ increases. Following these guidelines, selecting b and selecting $\lambda$ are called centering and bounding the exponents of the risk-averting error criterion respectively.

Either centering or bounding the exponents or both can be integrated into the foregoing training algorithm described by a pseudo computer program. For instance, an initial value of $\lambda$ can be selected by setting $\lambda=0.9\cdot 26/(q_{max}-q_{min})$, and at the same time, we set $b=(q_{max}+q_{min})/2$. If minimizing the maximum absolute deviations of the outputs of a neural system or a regression model from the corresponding output measurements is the main goal, centering and bounding the exponents of the risk-averting error criterion can be performed to have as large a risk-sensitivity index as feasible in the training process.

Numerical examples reported in James T. Lo and Devasis Bassu, "An Adaptive Method of Training Multilayer Perceptrons" and "Robust Identification of Dynamical Systems By Neurocomputing," in Proceedings of the 2001 International Joint Conference on Neural Networks numerically confirm that the foregoing adaptive training method is effective in selecting a suitable risk-sensitivity index and avoiding poor local minima of the risk-averting error criterion adaptively selected by the method.

The convexification method described above can easily be extended to those of estimating regression coefficients of regression models by a person with ordinary skill in the art.

Further Training/Estimating wrt Risk-Neutral Error Criteria

As discussed earlier on, if a neural network is to be trained with respect to a given risk-averting error criterion, training the neural network with respect to a risk-averting error criterion associated with the given risk-averting error criterion has the benefit of avoiding poor local minima. It was also discussed earlier on that after such a training with respect to an associated risk-averting error criterion is completed, if the exponents in the associated risk-averting error criterion (e.g. products of the risk-sensitivity index and the squared errors $$\lambda\|y_k - \hat{f}(x_k, \omega)\|_2^2,$$

for k=1, ..., K) are not small and the exponential functions (e.g. exp $$\left(\text{e.g. } \exp\left[\lambda\|y_k - \hat{f}(x_k, \omega)\|_2^2\right]\right)$$

are not very close to the exponents plus 1 (e.g.

$$\left(\text{e.g. } 1 + \lambda\|y_k - \hat{f}(x_k, \omega)\|_2^2\right),$$

then the neural network obtained is usually not good enough for the given risk-neutral error criterion, and further training with respect to the given risk-neutral error criterion is necessary.

In an embodiment of the invented method of training neural systems with respect to a given risk-neutral error criterion, we first train a number of neural systems with respect to a risk-averting error criterion with different values of the risk-sensitivity index $\lambda$ to obtain the same number of risk-averting neural systems, the risk-averting error criterion being that associated with the given risk-neutral error criterion. Then we evaluate the value of the given risk-neutral error criterion for each risk-averting neural system just obtained. A risk-averting neural system that has a smallest value of the risk-neutral error criterion is then selected as our product of training. Obviously, if the training product is not satisfactory with respect to the given risk-neutral error criterion, more neural systems can be trained with respect to the associated risk-averting error criterion with different values of the risk-sensitivity index $\lambda$, until a satisfactory neural system is produced. The selection of different values of the risk-sensitivity index $\lambda$ for training with respect to the risk-averting error criteria with these values of the risk-sensitivity index $\lambda$ can be either programmed in the training software or done manually or both.

In another embodiment of the invented method of training neural systems with respect to a given risk-neutral error criterion, we first train at least one neural system with respect to risk-averting error criterion with different values of the risk-sensitivity index $\lambda$ to obtain at least one risk-averting neural system, the risk-averting error criterion being that associated with the given risk-neutral error criterion. Then we evaluate the value of the given risk-neutral error criterion for each risk-averting neural system just obtained. A risk-averting neural system that has a smallest value of the risk-neutral error criterion is selected. If it is not satisfactory for the given risk-neutral error criterion, further training of the selected neural system is needed. There are two ways for the further training. First, we train this selected neural system further with respect to the given risk-neutral error criterion using a local-search optimization method. In other words, the selected neural system is further trained by a local-search optimization method to minimize the given risk-neutral error criterion, using the weights of the selected neural system as the "initial guess." Second, we continue training the neural system with respect to the associated risk-averting error criterion but with gradually decreasing values of the risk-sensitivity index $\lambda$, and eventually we train the neural system with respect to the risk-neutral error criterion. In this process of further training, the weights obtained at each stage are used as the initial guess for the next stage.

In a third embodiment of the invented method of training neural systems with respect to a risk-neutral error criterion, we first use the adaptive risk-averting method described earlier on to train a neural system with respect to a risk-averting error criterion. In the process of training, we evaluate the given risk-neutral error criterion for each weight vector obtained after each iteration in the process, and stop the adaptive risk-averting method whenever a satisfactory value of the risk-neutral error criterion is obtained or the adaptive risk-averting method is completed. If the resultant neural system is not satisfactory for the given risk-neutral error criterion, further training of the resultant neural system is needed. There are two ways for the further training. First, we train this resultant neural system further with respect to the given risk-neutral error criterion using a local-search optimization method. In other words, the resultant neural system is further trained by a local-search optimization method to minimize the given risk-neutral error criterion, using the weights of the selected neural system as the "initial guess." Second, we continue training the resultant neural system with respect to the associated risk-averting error criterion but with gradually decreasing values of the risk-sensitivity index $\lambda$, and eventually we train the neural system with respect to the risk-neutral error criterion. In this process of further training, the weights obtained at each stage are used as the initial guess for the next stage.

As stressed many times, all the discussions on and embodiments of the disclosed invention for training neural systems can easily be extended for estimating regression models.

Conclusion, Ramification, and Scope of Invention

A method of training neural systems and estimating regression coefficients of regression models is disclosed. The disclosed method employs risk-averting error criteria judiciously. If a neural system or regression model is to be respectively trained or estimated with respect to a risk-averting error criterion, the disclosed method is numerically feasible and effective. If a neural system or regression model is to be respectively trained or estimated with respect to a risk-neutral criterion such as a standard sum-of-squares error criterion, the method can avoid poor local minima of the risk-neutral criterion.

While our descriptions hereinabove contain many specificities, these should not be construed as limitations on the scope of the invention, but rather as an exemplification of preferred embodiments. In addition to these embodiments, those skilled in the art will recognize that other embodiments are possible within the teachings of the present invention. Accordingly, the scope of the present invention should be limited only by the appended claims and their appropriately construed legal equivalents.

What is claimed is:

1. A method of training a neural system that comprises a neural network, said method comprising the steps of
    evaluating a risk-averting error criterion;
    adjusting at least one weight of said neural network to reduce a value of said risk-averting error criterion; and
    adjusting a risk-sensitivity index of said risk-averting error criterion,
wherein said risk-averting error criterion comprises an exponential function of an output of said neural system.

2. The method of claim 1, wherein said step of adjusting a risk-sensitivity index is performed through starting with a small said risk-sensitivity index and gradually increasing said risk-sensitivity index.

3. The method of claim 1, wherein said step of adjusting a risk-sensitivity index is performed through starting with a small said risk-sensitivity index, gradually increasing said risk-sensitivity index, and then reducing said risk-sensitivity index to a given value.

4. The method of claim 1, wherein said step of adjusting a risk-sensitivity index is performed by a method comprising a step of centering and bounding a plurality of exponents in said risk-averting error criterion.

5. A method of training a neural system with respect to a risk-neutral error criterion, said neural system comprising a neural network, said method comprising the steps of
    training said neural system with respect to a risk-averting error criterion; and
    further training said neural system with respect to said risk-neutral error criterion,
wherein said risk-averting error criterion comprises an exponential function of an output of said neural system, and whereby said neural system will have a small value of said risk-neutral error criterion.

6. The method of claim 5, wherein said risk-neutral error criterion is a sum-of-squares error criterion.

7. The method of claim 5, wherein said step of further training said neural system with respect to said risk-neutral error criterion is performed by a local-search optimization method starting with weights of said neural system obtained from said step of training said neural system with respect to a risk-averting error criterion.

8. The method of claim 5, wherein said step of training said neural system with respect to a risk-averting error criterion is performed by a method comprising the steps of
    evaluating said risk-averting error criterion;
    adjusting at least one weight of said neural system to reduce said risk-averting error criterion; and
    adjusting a risk-sensitivity index of said risk-averting error criterion.

9. The method of claim 8, wherein said step of adjusting a risk-sensitivity index is performed through starting with a small risk-sensitivity index, gradually increasing said risk-sensitivity index.

10. The method of claim 8, wherein said step of adjusting a risk-sensitivity index is performed by a method comprising a step of centering and bounding a plurality of exponents in said risk-averting error criterion.

11. A method of estimating at least one regression coefficient of a regression model, said method comprising the steps of
    evaluating a risk-averting error criterion;
    adjusting said at least one regression coefficient to reduce a value of said risk-averting error criterion; and
    adjusting a risk-sensitivity index of said risk-averting error criterion,
wherein said risk-averting error criterion comprises an exponential function of an output of said regression model.

12. The method of claim 11, wherein said step of adjusting a risk-sensitivity index is performed through starting with a small said risk-sensitivity index and gradually increasing said risk-sensitivity index.

13. The method of claim 11, wherein said step of adjusting a risk-sensitivity index is performed through starting with a small said risk-sensitivity index, gradually increasing said risk-sensitivity index, and then reducing said risk-sensitivity index to a given value.

14. The method of claim 11, wherein said step of adjusting a risk-sensitivity index is performed by a method comprising a step of centering and bounding a plurality of exponents in said risk-averting error criterion.

15. A method of estimating at least one regression coefficient of a regression model with respect to a risk-neutral error criterion, said method comprising the steps of
estimating said at least one regression coefficient with respect to a risk-averting error criterion; and
further estimating said at least one regression coefficient with respect to said risk-neutral error criterion,
wherein said risk-averting error criterion comprises an exponential function of an output of said regression model, whereby said regression model will have a small value of said risk-neutral error criterion.

16. The method of claim 15, wherein said risk-neutral error criterion is a sum-of-squares error criterion.

17. The method of claim 15, wherein said step of further training said neural system with respect to said risk-neutral error criterion is performed by a local-search optimization method starting with coefficients of said regression model obtained from said step of estimating said at least one regression coefficient with respect to a risk-averting error criterion.

18. The method of claim 15, wherein said step of further estimating said at least one regression co-efficient with respect to said risk-neutral error criterion is performed by a method comprising the steps of
evaluating a risk-averting error criterion;
adjusting said at least one regression coefficient to reduce said risk-averting error criterion; and
adjusting a risk-sensitivity index of said risk-averting error criterion.

19. The method of claim 18, wherein said step of adjusting said risk-sensitivity index is performed through starting with a small risk-sensitivity index and gradually increasing said risk-sensitivity index.

20. The method of claim 18, wherein said step of adjusting a risk-sensitivity index is performed by a method comprising a step of centering and bounding a plurality of exponents in said risk-averting error criterion.

* * * * *